(12) United States Patent
Zavala Jurado et al.

(10) Patent No.: US 9,464,564 B2
(45) Date of Patent: Oct. 11, 2016

(54) SYSTEM AND METHOD FOR ESTIMATING A TURBINE OUTLET TEMPERATURE OR A TURBINE INLET TEMPERATURE BASED ON A WASTEGATE COMMAND

(71) Applicant: GM Global Technology Operations LLC, Detroit, MI (US)

(72) Inventors: Jose C. Zavala Jurado, Ann Arbor, MI (US); Yue-Yun Wang, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/046,027

(22) Filed: Oct. 4, 2013

(65) Prior Publication Data
US 2015/0096295 A1    Apr. 9, 2015

(51) Int. Cl.
| | |
|---|---|
| F01N 3/02 | (2006.01) |
| F01N 9/00 | (2006.01) |
| F02B 37/18 | (2006.01) |
| F02D 41/14 | (2006.01) |
| F02D 41/00 | (2006.01) |
| F02D 41/02 | (2006.01) |

(52) U.S. Cl.
CPC ............... *F02B 37/18* (2013.01); *F01N 9/005* (2013.01); *F02D 41/0007* (2013.01); *F02D 41/1447* (2013.01); F01N 2900/0601 (2013.01); F01N 2900/1404 (2013.01); F01N 2900/1602 (2013.01); F02D 41/024 (2013.01); F02D 41/0255 (2013.01); F02D 2200/0804 (2013.01); Y02T 10/144 (2013.01); Y02T 10/47 (2013.01)

(58) Field of Classification Search
CPC ........... F01N 9/005; F01N 2900/0601; F01N 2900/1404; F01N 2900/1602; F02B 37/18; F02D 41/0007; F02D 41/1447; F02D 41/024; F02D 41/0255; F02D 2200/0804
USPC ........................... 60/602; 701/101–102, 106
See application file for complete search history.

(56) References Cited

U.S. PATENT DOCUMENTS

2010/0107630 A1* 5/2010 Hamama et al. ............... 60/602
2012/0285161 A1* 11/2012 Kerns ................. F02D 41/0087
60/598

FOREIGN PATENT DOCUMENTS

CN           101737188 A      6/2010

OTHER PUBLICATIONS

David Garrod, Ph.D., Esq.; "Glossary of Judicial Claim Constructions in the Electronics, Computer and Business Method Arts"; p. 257; © 2010 ; 2 pages.

* cited by examiner

Primary Examiner — Audrey K Bradley
Assistant Examiner — Dapinder Singh (57) ABSTRACT

A system according to the principles of the present disclosure includes a boost control module and a temperature estimation module. The boost control module generates a wastegate command signal to control a position of a wastegate and thereby adjust an amount of exhaust gas allowed to bypass a turbine of a turbocharger through the wastegate. The temperature estimation module estimates at least one of a first temperature downstream from the turbine and a second temperature upstream from the turbine based on the wastegate command signal.

22 Claims, 3 Drawing Sheets

SYSTEM AND METHOD FOR ESTIMATING A TURBINE OUTLET TEMPERATURE OR A TURBINE INLET TEMPERATURE BASED ON A WASTEGATE COMMAND

FIELD

The present disclosure relates to internal combustion engines, and more specifically, to systems and methods for estimating a turbine outlet temperature or a turbine inlet temperature based on a wastegate command.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A system according to the principles of the present disclosure includes a boost control module and a temperature estimation module. The boost control module generates a wastegate command signal to control a position of a wastegate and thereby adjust an amount of exhaust gas allowed to bypass a turbine of a turbocharger through the wastegate. The temperature estimation module estimates at least one of a first temperature downstream from the turbine and a second temperature upstream from the turbine based on the wastegate command signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A turbocharger typically includes a turbine disposed in an exhaust system of an engine and a compressor disposed in an intake system of the engine. The turbine is powered by exhaust gas flowing through the exhaust system. The compressor is driven by the turbine and compresses intake air entering an engine. The amount of boost provided by the turbocharger may be adjusted by adjusting the position of a wastegate that allows exhaust gas to bypass the turbine.

The turbine is typically disposed upstream from a catalytic converter. Thus, the temperature of exhaust gas on an outlet side of the turbine may be monitored to determine when a catalyst in the catalytic converter reaches its light-off temperature and to ensure that the catalyst is not damaged due to overheating. The turbine outlet temperature may be estimated, for example, to avoid the cost of a temperature sensor. In a two-stage turbocharger system, the temperature of exhaust gas between two turbines may be estimated to coordinate control of two corresponding wastegates.

The turbine outlet temperature may be estimated based on analytical models that assume isentropic expansion of exhaust gas flowing through the turbine and the wastegate. In the analytical models, the turbine outlet temperature may be based on unknown parameters such as a ratio of the mass flow rate of exhaust gas flowing through the turbine to the mass flow rate of exhaust gas flowing through the wastegate. The unknown parameters may be estimated based on known parameters, such as the flow area of the turbine and the flow area of the wastegate, if certain assumptions are made. However, making these assumptions when estimating the unknown parameters may lead to inaccuracies in the estimated turbine outlet temperature.

A system and method according to the present disclosure estimates the turbine outlet temperature based on a turbine inlet temperature, a pressure ratio across the turbine, and a wastegate command using, for example, a lookup table and/or an equation. For example, the system and method may obtain a value from a lookup table based on the pressure ratio and the wastegate command, and calculate the product of the turbine inlet temperature and the value to obtain the turbine outlet temperature. Alternatively, the system and method may use a flow rate of the total amount of exhaust gas flowing through the turbine and the wastegate in place of the pressure ratio.

The turbine inlet temperature, the pressure ratio, the wastegate command, and the exhaust flow rate may be measured or calculated based on measured parameters. Thus, the system and method avoids inaccuracies associated with making assumptions when estimating the turbine outlet temperature based on unknown parameters. In addition, the wastegate command may be more directly related to the turbine outlet temperature than other variables. Thus, the system and method may provide a more accurate estimate of the turbine outlet temperature relative to systems and methods that do not estimate the turbine outlet temperature based on the wastegate command.

In various implementations, instead of measuring the turbine inlet temperature and estimating the turbine outlet temperature, the system and method may measure the turbine outlet temperature and estimate the turbine inlet temperature. The system and method may estimate the turbine inlet temperature based on the turbine outlet temperature, the pressure ratio, and the wastegate command using, for example, a lookup table and/or an equation. Alternatively, the system and method may use the exhaust flow rate in place of the pressure ratio to estimate the turbine inlet temperature.

Figure 1:
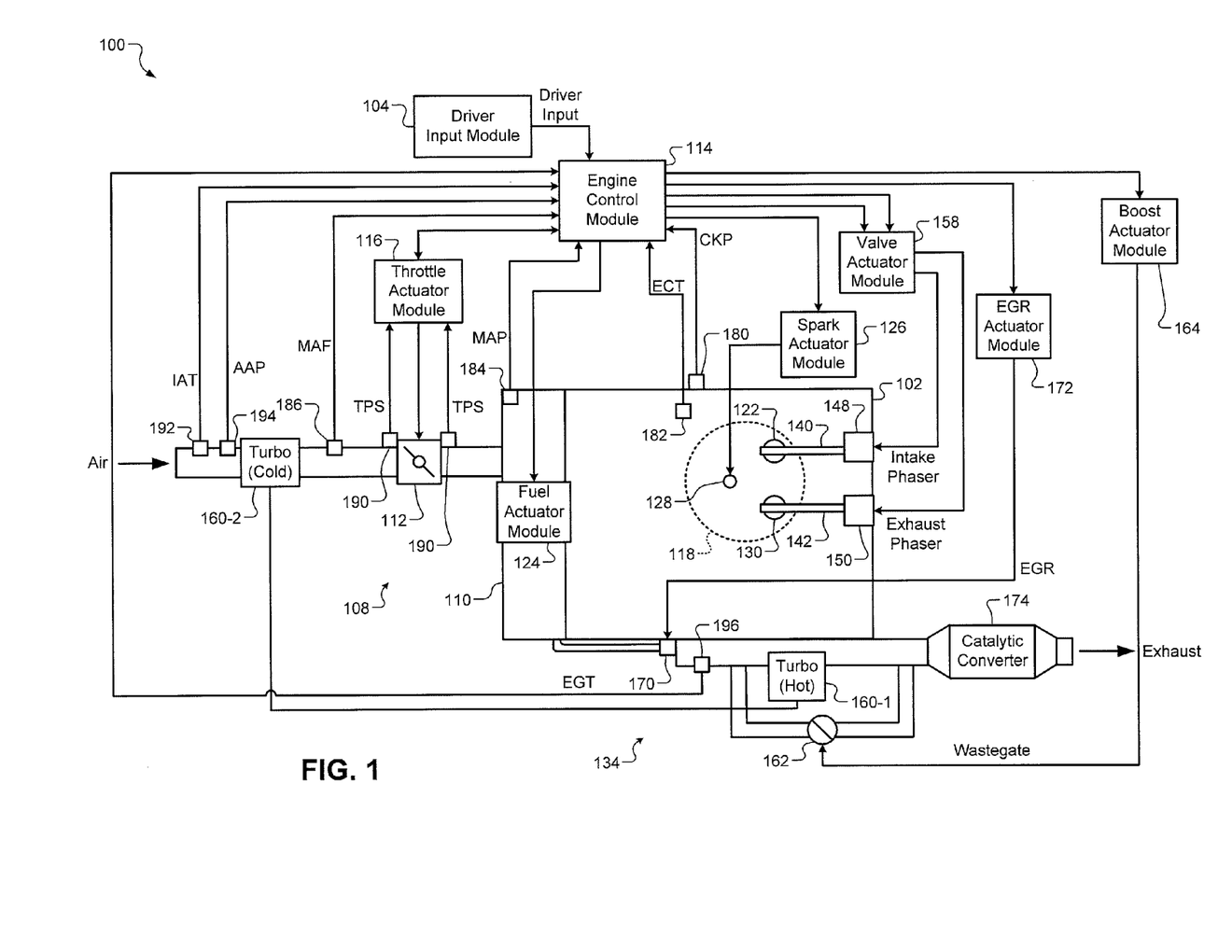
FIG. 1 is a functional block diagram of an example engine system according to the principles of the present disclosure.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on cruise control system, which may be an adaptive cruise control system that varies vehicle speed to maintain a predetermined following distance.

Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake and exhaust cam phasers 148, 150 based on signals from the ECM 114. When implemented, variable valve lift may also be controlled by the valve actuator module 158.

The valve actuator module 158 may deactivate the cylinder 118 by disabling opening of the intake valve 122 and/or the exhaust valve 130. The valve actuator module 158 may disable opening of the intake valve 122 by decoupling the intake valve 122 from the intake cam phaser 148. Similarly, the valve actuator module 158 may disable opening of the exhaust valve 130 by decoupling the exhaust valve 130 from the exhaust cam phaser 150. In various implementations, the valve actuator module 158 may control the intake valve 122 and/or the exhaust valve 130 using devices other than camshafts, such as electromagnetic or electrohydraulic actuators.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The exhaust system 134 may include an exhaust gas recirculation (EGR) valve 170, which selectively redirects exhaust gas back to the intake manifold 110. The EGR valve 170 may be located upstream from the turbocharger's turbine 160-1. The EGR valve 170 may be controlled by an EGR actuator module 172. The exhaust system 134 may also include a catalytic converter 174, which reduces emissions in the exhaust gas.

The engine system 100 may measure the position, of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The temperature of ambient air being drawn into the engine 102 may be measured using an intake air temperature (IAT) sensor 192. The pressure of ambient air being drawn into the engine 102 may be measured using an ambient air pressure sensor (AAP) sensor 194. The temperature of exhaust gas may be measured using an exhaust gas temperature (EGT) sensor 196. The EGT sensor 196 may be located upstream from the turbocharger's turbine 160-1. For example, exhaust gas flowing through the wastegate 162 may separate from exhaust gas flowing through the turbine 160-1 at a first location, and the EGT sensor 196 may be located at a second location between the engine 102 and the first location. The ECM 114 may use signals from the sensors to make control decisions for the engine system 100.

Figure 2:
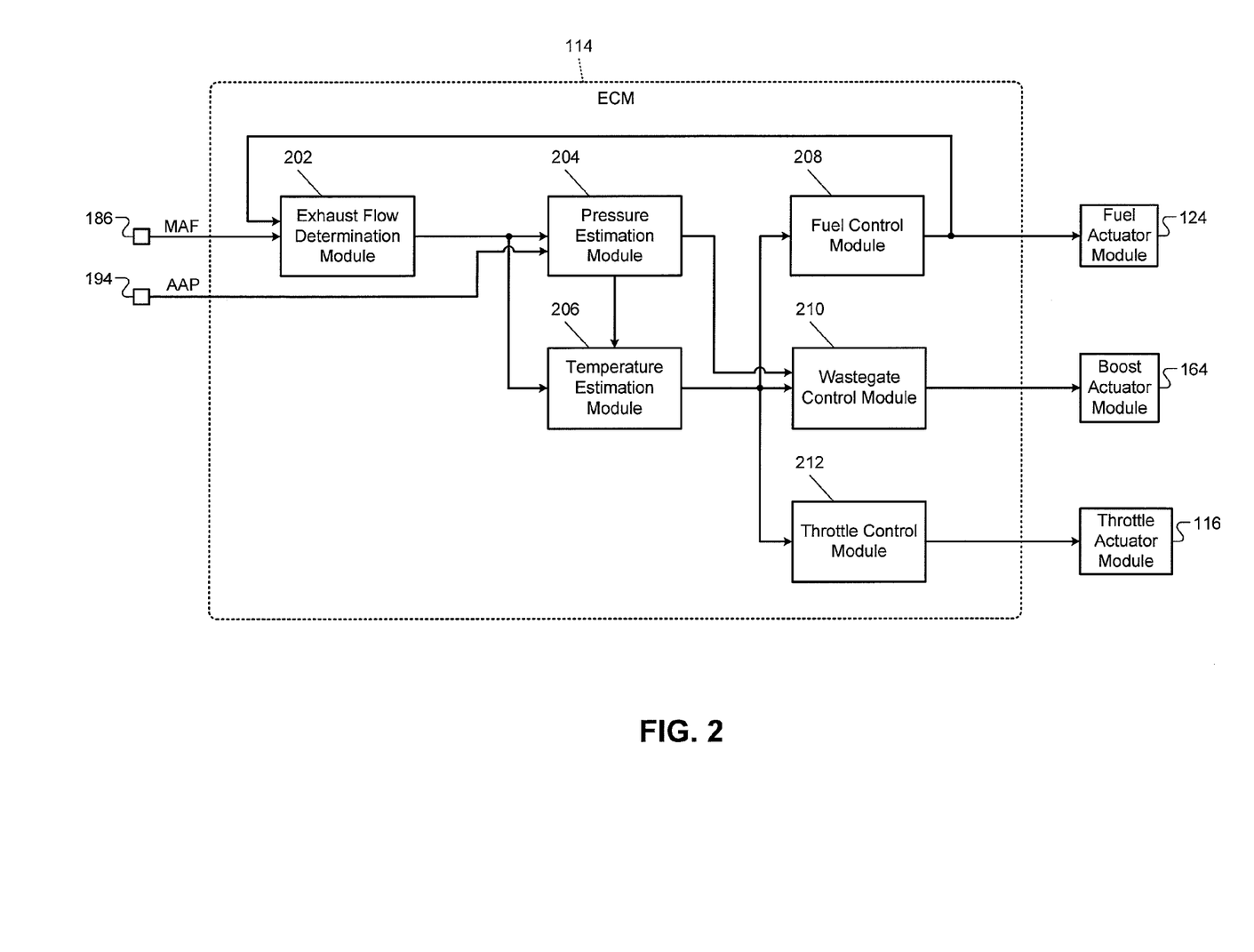
FIG. 2 is a functional block diagram of an example control system according to the principles of the present disclosure.

Referring now to FIG. 2, an example implementation of the ECM 114 includes an exhaust flow module 202, a pressure estimation module 204, and a temperature estimation module 206. The exhaust flow determination module 202 determines a mass flow rate of exhaust gas produced by the engine 102. The exhaust flow determination module 202 may determine the exhaust flow rate based on the mass flow rate of intake air from the MAF sensor 186 and a mass flow rate of fuel provided to cylinders of the engine 102. For example, the exhaust flow determination module 202 may determine that the exhaust flow rate is equal to a sum of the intake air flow rate and the fuel flow rate.

The exhaust flow determination module 202 may determine the mass flow rate of fuel provided to cylinders of the engine 102 based on a fueling rate command signal generated by a fuel control module 208. The fuel control module 208 may generate the fueling rate command signal to control the rate at which fuel is provided to cylinders of the engine 102. In turn, the fuel actuator module 124 may adjust the pulse width of fuel injectors to achieve a fueling rate indicated by the fueling rate command signal.

The pressure estimation module 204 estimates a first pressure downstream from the turbine 160-1, for example, at a location between the turbine 160-1 and the catalytic converter 174. The pressure estimation module 204 may estimate the first pressure based on the ambient pressure and the exhaust flow rate. The pressure estimation module 204 may receive the ambient pressure from the AAP sensor 194, or the pressure estimation module 204 may estimate the ambient pressure based on, for example, an altitude and/or a geographic location. The pressure estimation module 204 may receive the exhaust flow rate from the exhaust flow determination module 202.

The pressure estimation module 204 also estimates a second pressure upstream from the turbine 160-1. The pressure estimation module 204 may estimate the second pressure based on the first pressure, the exhaust flow rate, and the wastegate position using a relationship such as $$P_2 = P_1 * f(Q_{ex}, A_{wg}) \qquad (1)$$

where $P_1$ is the first pressure, $P_2$ is the second pressure, $Q_{ex}$ is the exhaust flow rate, and $A_{wg}$ is the wastegate position. This relationship may be embodied in an equation (e.g., a polynomial function) and/or a lookup table.

As relationship (1) indicates, the second pressure may be equal to a product of the first pressure and a value that is a function of the exhaust flow rate and the wastegate position. The pressure estimation module 204 may use a wastegate command as an approximation of the wastegate position. The first pressure may be referred to as a turbine outlet pressure, and the second pressure may be referred to as a turbine inlet pressure.

The temperature estimation module 206 may estimate a first temperature downstream from the turbine 160-1 based on a second temperature upstream from the turbine 160-1, a pressure ratio across the turbine 160-1, and a wastegate duty cycle. The temperature estimation module 206 may receive the second temperature from the EGT sensor 196. The pressure ratio across the turbine 160-1 is a ratio of the first pressure downstream from the turbine 160-1 to the second pressure upstream from the turbine 160-1. The temperature estimation module 206 may receive the first and second pressures from the pressure estimation module 204 and determine the pressure ratio based thereon. Alternatively, the pressure estimation module 204 may determine the pressure ratio based on the first and second pressures and output the pressure ratio to the temperature estimation module 206.

The temperature estimation module 206 may receive the wastegate duty cycle via a wastegate command signal generated by a wastegate control module 210. The wastegate control module 210 may generate the wastegate command signal to adjust an amount of exhaust flow through the wastegate 162. In turn, the boost actuator module 164 may adjust the wastegate duty cycle to achieve a desired wastegate duty cycle indicated by the wastegate command signal. By adjusting the wastegate duty cycle, the boost actuator module 164 may adjust the wastegate 162 to a fully open position, a fully closed position, and positions therebetween. For example, the wastegate 162 may be fully closed when the wastegate duty cycle is 100 percent, and the wastegate 162 may be fully open when the wastegate duty cycle is 0 percent.

The first temperature downstream from the turbine 160-1 may be referred to as a turbine outlet pressure, the second temperature upstream from the turbine 160-1 may be referred to as a turbine inlet temperature, and the wastegate duty cycle may be referred to as a wastegate command. The temperature estimation module 206 may estimate the turbine outlet temperature based on the turbine inlet temperature, the pressure ratio, and the wastegate command using a relationship such as $$T_{to}=T_{ti}*f(P_{rt},WG_{cmd}) \quad (2)$$

where $T_{to}$ is the turbine outlet temperature, $P_{rt}$ is the pressure ratio, and $WG_{cmd}$ is the wastegate command. This relationship may be embodied in an equation (e.g., a polynomial function) and/or a lookup table.

As relationship (2) indicates, the turbine outlet temperature may be equal to a product of the turbine inlet temperature and a first value that is a function of the pressure ratio and the wastegate command. The first value may be obtained from a lookup table using the pressure ratio and the wastegate command. The turbine outlet temperature may be determined based on the product of the turbine inlet temperature and the first value, rather than determining the turbine outlet temperature based on a function of the turbine inlet temperature, for two reasons. First, it may be assumed that the turbine inlet temperature is more directly related to the turbine outlet temperature than any other variable. Second, excluding the turbine inlet temperature from the lookup table simplifies the lookup table, as the lookup table includes two variables instead of three variables.

The exhaust flow rate may be used in place of the pressure ratio in relationship (2). For example, the temperature estimation module 206 may estimate the turbine outlet temperature based on the turbine inlet temperature, the wastegate command, and the exhaust flow rate using a relationship such as $$T_{to}=T_{ti}*f(WG_{cmd},Q_{ex}) \quad (3)$$

where $Q_{ex}$ is the exhaust flow rate. This relationship may be embodied in an equation (e.g., a polynomial function) and/or a lookup table. As relationship (3) indicates, the turbine outlet temperature may be equal to a product of the turbine inlet temperature and a second value that is a function of the wastegate command and the exhaust flow rate. The second value may be obtained from a lookup table using the wastegate command and the exhaust flow rate.

In another example, the temperature estimation module 206 may estimate the turbine outlet temperature based on the turbine inlet temperature, the exhaust flow rate, and the wastegate command using a relationship such as $$T_{to}=A_0*T_{ti}+A_1*W_{cmd}+A_2*Q_{ex}+A_3P_{rt}^2+A_4*W_{cmd}^2+\ldots+A_nW_{cmd}^m+A_{n+1}*Q_{ex}^m \quad (4)$$

where $A_0$, $A_1$, $A_2$, $A_3$, $A_4$, $A_n$, and $A_{n+1}$ are coefficients. Relationship (4) may also include cross terms, such as $W_{cmd}Q_{ex}$. In addition, the pressure ratio may be used in place of the exhaust flow rate in relationship (4).

In various implementations, instead of estimating the turbine outlet temperature based on the turbine inlet temperature, the temperature estimation module 206 may estimate the turbine inlet temperature based on the turbine outlet temperature, the pressure ratio, and the wastegate command using a relationship such as $$T_{ti}=T_{to}*f(P_{rt},WG_{cmd}) \quad (5)$$

This relationship may be embodied in an equation (e.g., a polynomial function) and/or a lookup table. The pressure ratio and the wastegate command may be determined as described above with respect to relationship (2). The turbine outlet temperature may be measured using a temperature sensor disposed downstream from the turbine 160-1, for example, at a location between the turbine 160-1 and the catalytic converter 174.

The exhaust flow rate may be used in place of the pressure ratio in relationship (5). For example, the temperature estimation module 206 may estimate the turbine inlet temperature based on the turbine outlet temperature, the wastegate command, and the exhaust flow rate using a relationship such as $$T_{ti}=T_{to}*f(W_{cmd},Q_{ex}) \quad (6)$$

This relationship may be embodied in an equation (e.g., a polynomial function) and/or a lookup table.

In another example, the temperature estimation module 206 may estimate the turbine inlet temperature based on the turbine outlet temperature, the exhaust flow rate, and the wastegate command using a relationship such as $$T_{ti}=B_0*T_{to}+B_i*W_{cmd}+B_2*Q_{ex}+B_3W_{cmd}^2+B_4*Q_{ex}^2+\ldots+B_nW_{cmd}^m+B_{n+1}*Q_{ex}^m \quad (7)$$

where $B_0$, $B_1$, $B_2$, $B_3$, $B_4$, $B_n$, and $B_{n+1}$ are coefficients. Relationship (7) may also include cross terms, such as $W_{cmd}Q_{ex}$. In addition, the pressure ratio may be used in place of the exhaust flow rate in relationship (7).

Relationships (1) through (7), and the lookup tables, equations, and/or coefficients embodying relationships (1) through (7), may be defined based on physical testing, computer simulation, and/or analytical models. For example, using a vehicle on a road or in a laboratory, a lookup table embodying the function in relationship (2) may be developed by measuring the turbine inlet pressure and the turbine outlet pressure and monitoring the wastegate command. In another example, relationships (1) through (7) may be based on analytical models that assume isentropic expansion of the exhaust gas flowing through the turbine 160-1 and the wastegate 162.

To this end, assuming isentropic expansion through the wastegate 162, the temperature of the exhaust gas exiting the wastegate 162 may be modeled using the following relationship:

$$T_W = P_{rt}^{(\frac{\gamma-1}{\gamma})} T_{ti} \quad (8)$$

where $T_W$ is the temperature of the exhaust gas exiting the wastegate 162 and $\gamma$ is the ratio of specific heats of the exhaust gas. Exhaust gas exiting the wastegate 162 may be combined with exhaust gas exiting the turbine 160-1 at a first location, and the temperature $T_w$ may correspond to a second location between the wastegate 162 and the first location. The ratio of specific heats $\gamma$ is an isentropic coefficient indicating how much heat can be absorbed or desorbed at a constant temperature and pressure.

In addition, assuming isentropic expansion through the turbine 160-1, the temperature of the exhaust gas exiting the turbine 160-1 may be modeled using the following relationship:

$$T_t = \left[1 - \eta_t\left(1 - P_{rt}^{\left(\frac{\gamma-1}{\gamma}\right)}\right)\right]T_{ti} \tag{9}$$

where Tt is the temperature of the exhaust gas exiting the turbine 160-1 and $\eta_t$ is a turbine efficiency. Exhaust gas exiting the wastegate 162 may be combined with exhaust gas exiting the turbine 160-1 at a first location, and the temperature $T_t$ may correspond to a second location between the wastegate 162 and the first location. The turbine efficiency may be predetermined or determined based on the pressure ratio across the turbine 160-1, a speed of the turbine 160-1, and a mass flow rate of exhaust gas flowing through the turbine 160-1.

The total exhaust flow through the wastegate 162 and the turbine 160-1 may be modeled using the following relationship:

$$\dot{m}_{ex}c_pT_{to} = \dot{m}_W c_p T_W + \dot{m}_t c_p T_t \tag{10}$$

where $\dot{m}_{ex}$ is the mass flow rate of the total amount of exhaust gas flowing through the wastegate 162 and the turbine 160-1, $c_p$ is a specific heat of the exhaust gas, $\dot{m}_W$ is the mass flow rate of exhaust gas flowing through the wastegate 162, and $\dot{m}_t$ is the mass flow rate of exhaust gas flowing through the turbine 160-1. Relationship (10) may be rearranged to solve for temperature to yield the following relationship:

$$T_{to} = \left(1 - \frac{\dot{m}_t}{\dot{m}_{ex}}\right)T_W + \frac{\dot{m}_t}{\dot{m}_{ex}} * T_t \tag{11}$$

Assuming that the turbine efficiency is equal to 1, relationship (9) may be reduced to the following relationship:

$$T_t = P_{rt}^{\left(\frac{\gamma-1}{\gamma}\right)} T_{ti} \tag{12}$$

Relationships (8) and (12) may be substituted into relationship (10) to yield the following relationship:

$$T_{to} = \left(1 - \frac{\dot{m}_t}{\dot{m}_{ex}}\right)P_{rt}^{\left(\frac{\gamma-1}{\gamma}\right)} T_{ti} + \frac{\dot{m}_t}{\dot{m}_{ex}} P_{rt}^{\left(\frac{\gamma-1}{\gamma}\right)} T_{ti} \tag{13}$$

Relationship (13) may be simplified by replacing terms that are dependent on the ratio of specific heats γ with functions to yield the following relationship:

$$T_{to} = \left(1 - \frac{\dot{m}_t}{\dot{m}_{ex}}\right)g_0(P_{rt}, T_{ti}) + \frac{\dot{m}_t}{\dot{m}_{ex}}g_1(P_{rt}, T_{ti}) \tag{14}$$

where $g_0$ and $g_1$ are functions of the pressure ratio and the turbine inlet temperature.

Instead of modeling the turbine outlet temperature based on the pressure ratio as in relationship (14), the turbine outlet temperature may be modeled based on flow rates through the wastegate 162 and the turbine 160-1 using the following relationship:

$$T_{to} = \left(1 - \frac{\dot{m}_t}{\dot{m}_{ex}}\right)g_2(Q_W, T_{ti}) + \frac{\dot{m}_t}{\dot{m}_{ex}}g_3(Q_t, T_{ti}) \tag{15}$$

where $Q_W$ is the exhaust flow rate through the wastegate 162, $Q_t$ is the exhaust flow rate through the turbine 160-1, and $g_1$ is a function of the wastegate flow rate and the turbine inlet temperature, and $g_2$ is a function of the turbine flow rate and the turbine inlet temperature. The exhaust flow rates $Q_W$ and $Q_t$ can be expressed in terms of the exhaust flow rate $Q_{ex}$ and the mass flow rates $\dot{m}_t$, $\dot{m}_{ex}$ to yield the following relationship:

$$T_{to} = \left(1 - \frac{\dot{m}_t}{\dot{m}_{ex}}\right)g_2\left(\left(1 - \frac{\dot{m}_t}{\dot{m}_{ex}}\right)Q_{ex}, T_{ti}\right) + \frac{\dot{m}_t}{\dot{m}_{ex}}g_3\left(\frac{\dot{m}_t}{\dot{m}_{ex}}Q_{ex}, T_{ti}\right) \tag{16}$$

Relationship (16) may be simplified into the following relationship $$T_{to} = F_1\left(\frac{\dot{m}_t}{\dot{m}_{ex}}, Q_{ex}, T_{ti}\right) \tag{17}$$

where F1 is a function of a ratio of the turbine mass flow rate $\dot{m}_t$ to the exhaust mass flow rate $\dot{m}_{ex}$, the exhaust flow rate $Q_{ex}$, and the turbine inlet temperature $T_{ti}$. Alternatively, the pressure ratio $P_{rt}$ may be used in place of the exhaust flow rate $Q_{ex}$ to yield the following relationship:

$$T_{to} = F_2\left(\frac{\dot{m}_t}{\dot{m}_{ex}}, P_{rt}, T_{ti}\right) \tag{18}$$

where F2 is a function of the ratio of the turbine mass flow rate $\dot{m}_t$ to the exhaust mass flow rate $\dot{m}_{ex}$, the exhaust flow rate $Q_{ex}$, and the turbine inlet temperature $T_{ti}$.

In relationships (17) and (18), the ratio of the turbine mass flow rate $\dot{m}_t$ to the exhaust mass flow rate $\dot{m}_{ex}$ may be approximated using the following relationship:

$$\frac{\dot{m}_t}{\dot{m}_{ex}} \approx \frac{A_t}{A_t + A_W} \tag{19}$$

where $A_t$ is the flow area of the turbine 160-1 and $A_w$ is the flow area of the wastegate 162. In addition, the exhaust flow rate $Q_{ex}$ of relationships (17) and (18) may be determined using the following relationship:

$$Q_{ex} = (\dot{m}_a + \dot{m}_f)\frac{\sqrt{T_{ti}}}{P_{to}} \tag{20}$$

where $\dot{m}_a$ is a mass flow rate of air entering the engine 102, $\dot{m}_f$ is a mass flow rate of fuel delivered to cylinders of the engine 102, and $P_{to}$ is the turbine outlet temperature.

Relationship (2) is based on relationship (18), and relationship (3) is based on relationship (17). In both relationships (2) and (18), the turbine outlet temperature is based on the pressure ratio across the turbine 160-1 and the turbine inlet temperature. Similarly, in both relationships (3) and (17), the turbine outlet temperature is based on exhaust flow rate and the turbine inlet temperature. However, in relationships (17) and (18), the turbine outlet temperature is based on the ratio of the turbine mass flow rate $\dot{m}_t$ to the exhaust mass flow rate $\dot{m}_{ex}$. In contrast, in relationships (2) and (3), the turbine outlet temperature is based on the wastegate command. The relationship between the turbine outlet temperature and the wastegate command may be more direct than the relationship between the turbine outlet temperature and the ratio of the turbine mass flow rate $\dot{m}_t$ to the exhaust mass flow rate $\dot{m}_{ex}$. Thus, estimating the turbine outlet temperature using relationships (2) or relationship (3) may be more accurate than estimating the turbine outlet temperature using relationship (17) or relationship (18).

Also, in relationships (17) and (18), the turbine outlet temperature is based on a function of the turbine inlet temperature and two other variables. In contrast, in relationships (2) and (3), the turbine outlet temperature is based on a product of the turbine inlet temperature and a function of two other variables. In other words, in relationships (2) and (3), the turbine inlet temperature is placed outside of the function. The turbine inlet temperature may be more directly related to the turbine outlet temperature than any other variable. Thus, placing the turbine inlet temperature outside of the function may yield a more accurate estimate of the turbine outlet temperature. In addition, the functions of relationships (2) and (3) may be embodied in a lookup table. Thus, placing the turbine inlet temperature outside of the functions simplifies the lookup tables, as the lookup tables are a function of two variables instead of three variables.

The temperature estimation module 206 outputs the turbine outlet temperature and/or the turbine inlet temperature to the fuel control module 208, the wastegate control module 210, and a throttle control module 212. In turn, the fuel control module 208, the wastegate control module 210, and the throttle control module 212 control the fueling rate, the wastegate position, and the throttle position, respectively, to adjust the turbine outlet temperature and/or the turbine inlet temperature. The fuel control module 208 controls the fueling rate using the fueling rate command signal as described above. The wastegate control module 210 controls the wastegate position using the wastegate command signal as described above. The throttle control module 212 controls the throttle position by generating a throttle position signal and outputting the throttle position signal to the throttle actuator module 116.

The fuel control module 208, the wastegate control module 210, and/or the throttle control module 212 may adjust the temperature of exhaust gas flowing into the catalytic converter 174 prevent damage to a catalyst within the catalytic converter 174. In one example, the fuel control module 208 and the throttle control module 212 may control the fueling rate and the throttle position, respectively, to enrich the air/fuel ratio of the exhaust gas and thereby cool the catalyst. In another example, the wastegate control module 210 may adjust the wastegate position to route more exhaust gas through the turbine 160-1 to cool the exhaust gas and thereby cool the catalyst.

Figure 3:
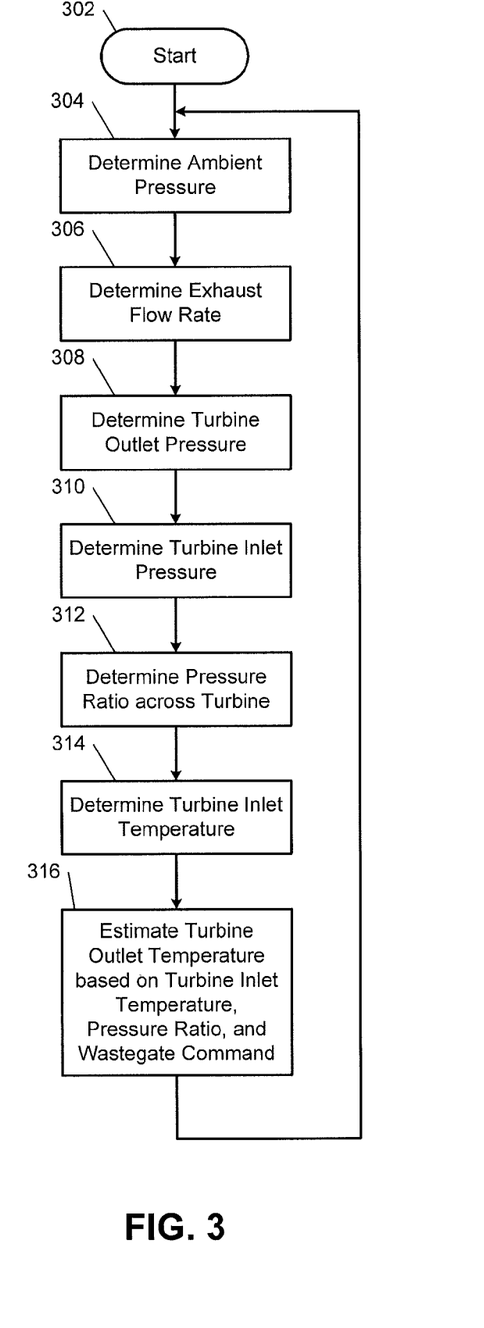
FIG. 3 is a flowchart illustrating an example control method according to the principles of the present disclosure.

Referring now to FIG. 3, an example method of estimating a temperature on an outlet side of a turbine begins at 302. The turbine may be powered by exhaust gas flowing through an exhaust system, and the turbine may drive a compressor that compresses air entering an engine. The turbine and the compressor may be part of a turbocharger. The amount of boost provided by the turbocharger may be adjusted by adjusting a position of a wastegate that allows exhaust gas to bypass the turbine. The method may generate a wastegate command signal to adjust the wastegate position.

At 304, the method determines a pressure of ambient air. The ambient air pressure may be measured in the exhaust system or in an intake system of the engine. Alternatively, the ambient air pressure may be determined based on an altitude and/or a geographic location.

At 306, the method determines a flow rate of exhaust gas output by the engine. The method may determine the exhaust flow rate based on a flow rate of intake air drawn into cylinders of an engine and a flow rate of fuel delivered to the cylinders. For example, the method may set the exhaust flow rate equal to a sum of the air flow rate and the fuel flow rate. The method may determine the air flow rate based on a throttle position, which may be measured and/or determined based-on a throttle control signal. The method may determine the fuel flow rate based on a fuel control signal.

At 308, the method determines a pressure on the outlet side of the turbine. For example, the method may determine the turbine outlet pressure at a location between the turbine outlet and a catalytic converter disposed downstream from the turbine. The method may determine the turbine outlet pressure based on the exhaust flow rate and the ambient pressure.

At 310, the method determines a pressure on an inlet side of the turbine. For example, exhaust gas flowing through the wastegate may separate from exhaust gas flowing through the turbine at a first location, and the method may determine the turbine inlet pressure at a second location between the first location and an inlet of the turbine. The method may determine the turbine inlet pressure based on the exhaust flow rate, the turbine outlet pressure, and the wastegate position.

At 312, the method determines a pressure ratio across the turbine. The pressure ratio across the turbine is a ratio of the turbine outlet pressure to the turbine inlet pressure. At 314, the method determines a temperature on the inlet side of the turbine. The method may measure the turbine inlet temperature. For example, exhaust gas flowing through the wastegate may separate from exhaust gas flowing through the turbine at a first location, and the method may measure the turbine inlet pressure at a second location between the engine and the first location.

At 316, the method estimates the temperature on the outlet side of a turbine. The method may use a lookup table and/or an equation (e.g., a polynomial function) to estimate the turbine outlet temperature based on the turbine inlet temperature, the pressure ratio, and a wastegate command indicated by the wastegate command signal. For example, the method may determine a first value based on the pressure ratio and the wastegate command using a lookup table, and may estimate the turbine outlet temperature based on a product of the turbine inlet temperature and the first value.

Alternatively, the method may estimate the turbine outlet temperature based on the turbine inlet temperature, the wastegate command, and the exhaust flow rate using a lookup table and/or an equation (e.g., a polynomial function). For example, the method may determine a second value based on the wastegate command and the exhaust flow rate using a lookup table, and may estimate the turbine outlet temperature based on a product of the turbine inlet temperature and the second value.

In various implementations, instead of measuring the turbine inlet temperature and estimating the turbine outlet temperature, the method may measure the turbine outlet temperature and estimate the turbine inlet temperature. The method may estimate the turbine inlet temperature based on the turbine outlet temperature, the pressure ratio, and the wastegate command using, for example, a lookup table and/or an equation. Alternatively, the method may estimate the turbine inlet temperature based on the turbine outlet temperature, the wastegate command, and the exhaust gas flow rate using, for example, a lookup table and/or an equation.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
    a first electronic circuit configured to generate a wastegate command signal to control a position of a wastegate and thereby adjust an amount of exhaust gas allowed to bypass a turbine of a turbocharger through the wastegate;
    a second electronic circuit configured to estimate a second temperature upstream from the turbine based on the wastegate command signal; and
    a third electronic circuit configured to adjust an actuator of an engine based on the second temperature.

2. The system of claim 1 further comprising the actuator of the engine.

3. The system of claim 1 wherein the first, second, and third electronic circuits include at least one of an Application Specific Integrated Circuit (ASIC), a discrete circuit, an integrated circuit, a combinational logic circuit, a field programmable gate array (FPGA), a processor, and memory.

4. The system of claim 1 wherein the second electronic circuit is configured to estimate the second temperature based on the wastegate command signal and a first temperature downstream from the turbine.

5. The system of claim 4 wherein the second electronic circuit is configured to estimate the second temperature based on the wastegate command signal, the first temperature, and a ratio of a first pressure downstream from the turbine to a second pressure upstream from the turbine.

6. The system of claim 5 wherein the second electronic circuit is configured to:
    determine a value based on the pressure ratio and the wastegate command signal using a lookup table; and
    estimate the second temperature based on a product of the first temperature and the value.

7. A system comprising:
    a first electronic circuit configured to generate a wastegate command signal to control a position of a wastegate and thereby adjust an amount of exhaust gas allowed to bypass a turbine of a turbocharger through the wastegate;
    a second electronic circuit configured to estimate a first temperature downstream from the turbine based on the wastegate command signal, based on a second temperature upstream from the turbine, and based on a ratio of a first pressure downstream from the turbine to a second pressure upstream from the turbine; and
    a third electronic circuit configured to adjust an actuator of an engine based on the first temperature.

8. The system of claim 7 further comprising the actuator of the engine.

9. The system of claim 7 wherein the first, second, and third electronic circuits include at least one of an Application Specific Integrated Circuit (ASIC), a discrete circuit, an integrated circuit, a combinational logic circuit, a field programmable gate array (FPGA), a processor, and memory.

10. The system of claim 7 further comprising a fourth electronic circuit configured to estimate the first pressure and the second pressure based on a flow rate of exhaust gas upstream from the turbine and an ambient pressure.

11. The system of claim 10 wherein the second electronic circuit is configured to:
    determine a value based on the pressure ratio and the wastegate command signal using a lookup table; and
    estimate the first temperature based on a product of the first temperature and the value.

12. The system of claim 10 wherein the second electronic circuit is configured to estimate the first temperature based on the wastegate command signal, the second temperature, and the pressure ratio using a polynomial function that relates the wastegate command signal, the second temperature, and the pressure ratio to the first temperature.

13. A method comprising:
generating a wastegate command signal to control a position of a wastegate and thereby adjust an amount of exhaust gas allowed to bypass a turbine of a turbocharger through the wastegate;
estimating a second temperature upstream from the turbine based on the wastegate command signal; and
adjusting an actuator of an engine based on the second temperature.

14. The method of claim 13 further comprising estimating the second temperature based on the wastegate command signal and a first temperature downstream from the turbine.

15. The method of claim 14 further comprising measuring the first temperature.

16. The method of claim 14 further comprising estimating the second temperature based on the wastegate command signal, the first temperature, and a ratio of a first pressure downstream from the turbine to a second pressure upstream from the turbine.

17. The method of claim 16 further comprising:
determining a value based on the pressure ratio and the wastegate command signal using a lookup table; and
estimating the second temperature based on a product of the first temperature and the value.

18. A method comprising:
generating a wastegate command signal to control a position of a wastegate and thereby adjust an amount of exhaust gas allowed to bypass a turbine of a turbocharger through the wastegate;
estimating a first temperature downstream from the turbine based on the wastegate command signal, based on a second temperature upstream from the turbine, and based on a ratio of a first pressure downstream from the turbine to a second pressure upstream from the turbine; and
adjusting an actuator of an engine based on the second temperature.

19. The method of claim 18 further comprising measuring the second temperature.

20. The method of claim 18 further comprising estimating the first pressure and the second pressure based on a flow rate of exhaust gas upstream from the turbine and an ambient pressure.

21. The method of claim 20 further comprising:
determining a value based on the pressure ratio and the wastegate command signal using a lookup table; and
estimating the first temperature based on a product of the first temperature and the value.

22. The method of claim 20 further comprising estimating the first temperature based on the wastegate command signal, the second temperature, and the pressure ratio using a polynomial function that relates the wastegate command signal, the second temperature, and the pressure ratio to the first temperature.

* * * * *